Inventor.
Robert Craig
by
atty.

July 1, 1947.  R. CRAIG  2,423,376
LATHE FOR TURNING DRILL SHANKS
Filed Jan. 15, 1944  5 Sheets-Sheet 3
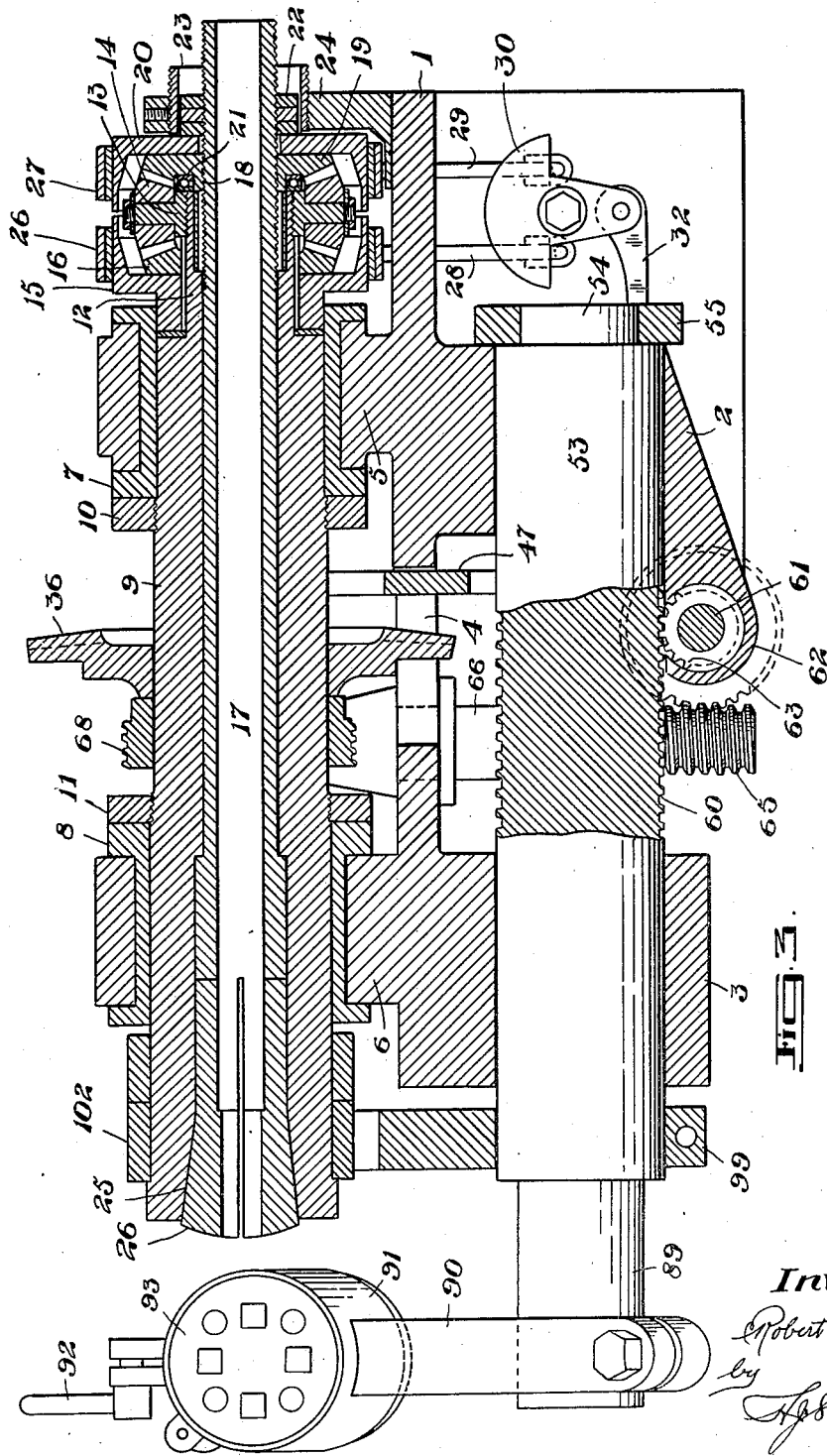

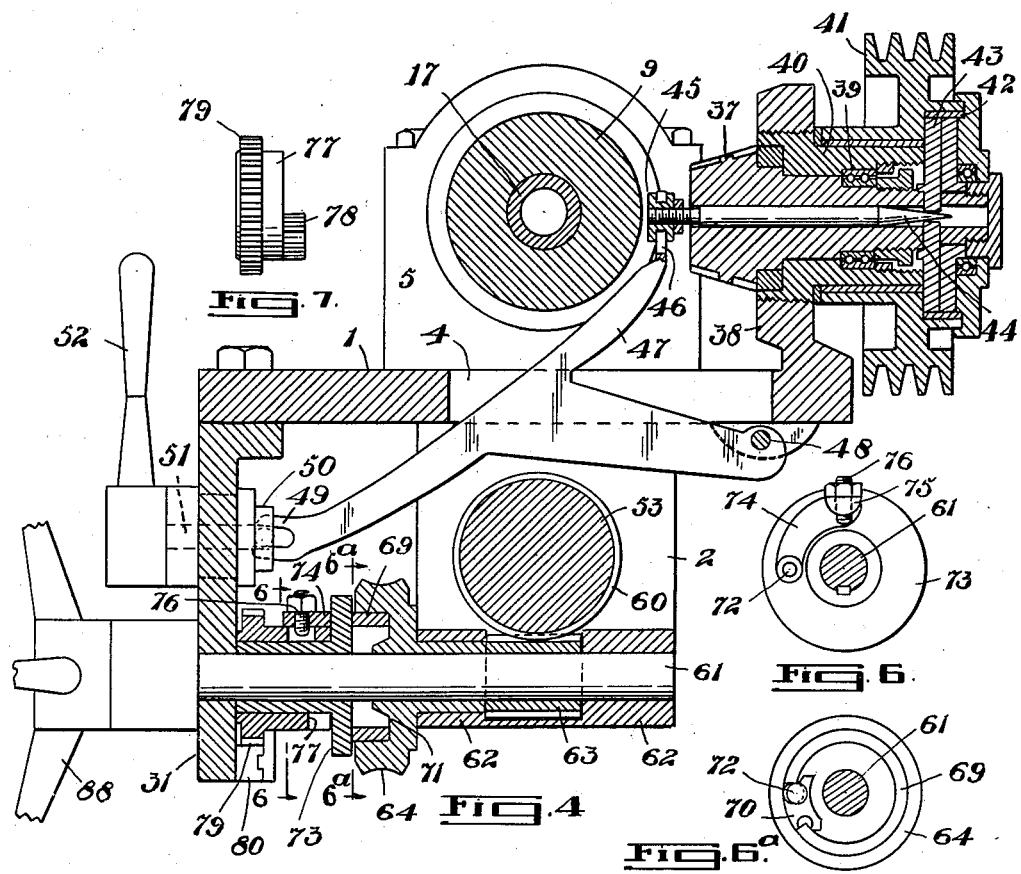
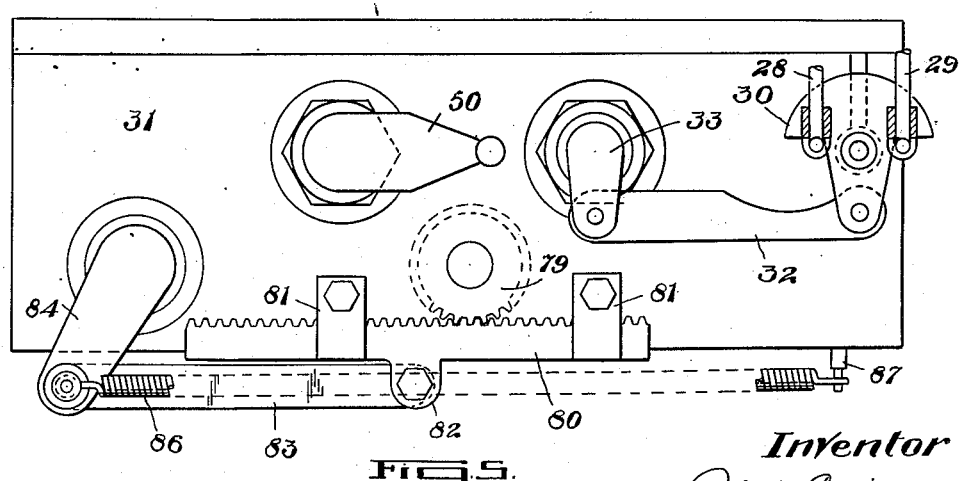

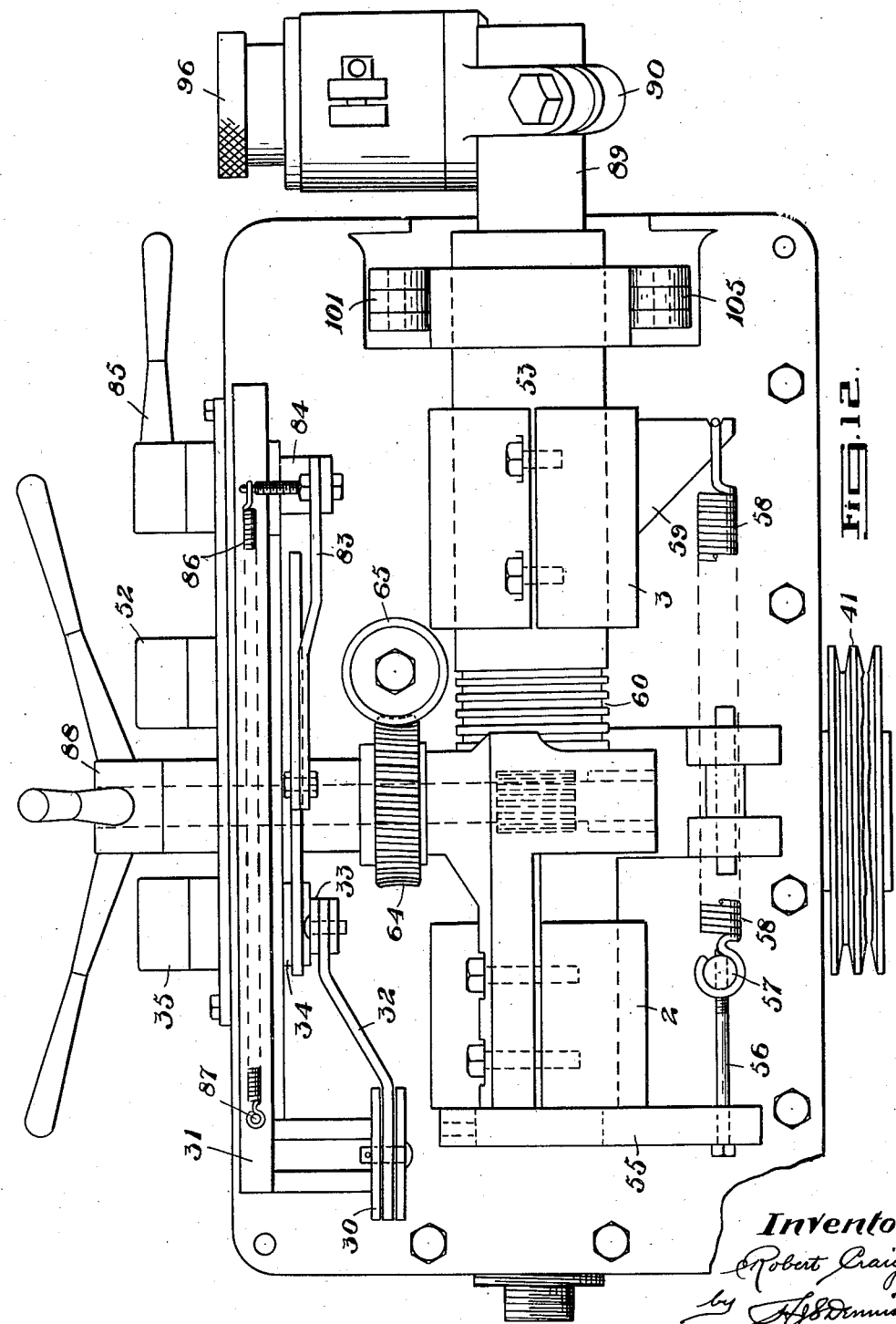

Patented July 1, 1947

2,423,376

UNITED STATES PATENT OFFICE 2,423,376

LATHE FOR TURNING DRILL SHANKS

Robert Craig, North Bay, Ontario, Canada, assignor to The Craig Bit Company, Limited, North Bay, Ontario, Canada Application January 15, 1944, Serial No. 518,472

7 Claims. (Cl. 82—19)

The principal object of the invention is to provide a lathe which will accurately and expeditiously shape the periphery of the end portion of a rock drill shank having an asymmetrical circumference adapted to fit into and engage the inner periphery of a similarly shaped socket portion of a rock drill bit.

A further object is to devise a lathe mechanism which will automatically grip and release the drill shank and will guide the tool for cutting the periphery of the shank with an irregular contour.

The principal features of the invention consist in the novel construction and arrangement of an axially journalled rotatable sleeve and a longitudinally movable collet or chuck for supporting and gripping the drill shank arranged within said sleeve and operated to move longitudinally in reverse directions by a threaded nut differentially operated, a cutting tool holder being rockably mounted on a longitudinally movable member and said rockable member being rocked by a pattern cam mounted on said rotatable sleeve.

A further feature of the construction resides in the novel mechanism for translating the rotary movement of the shank holder to longitudinal movement applied to said tool holder to effect the longitudinal feed of the cutting tool.

In the accompanying drawings

Figure 3 is a longitudinal vertical mid-section of the machine taken on the line 3—3 of Figure 1.

Figure 4 is a vertical cross sectional view of the machine taken on the line 4—4 and 4—4b of Figure 1.

Figure 5 is an elevational view of the control devices arranged on the inner side of the frame as seen from a plane on the line 5—5 of Figure 1.

Figure 6 is a detail elevational view of the clutch operating element of the mechanism for automatically operating the longitudinal movement of the tool holder as seen from the line 6—6 of Figure 4.

Figure 6a is a detail elevational view of the clutch element within the worm wheel drive of the automatic longitudinal movement of the tool holder as seen from the line 6a—6a on Figure 4.

Figure 7 is a side elevational view of the clutch gear shown in Figure 4.

Figure 12 is an underside plan view of the lathe illustrated in Figure 1.

Figure 1:
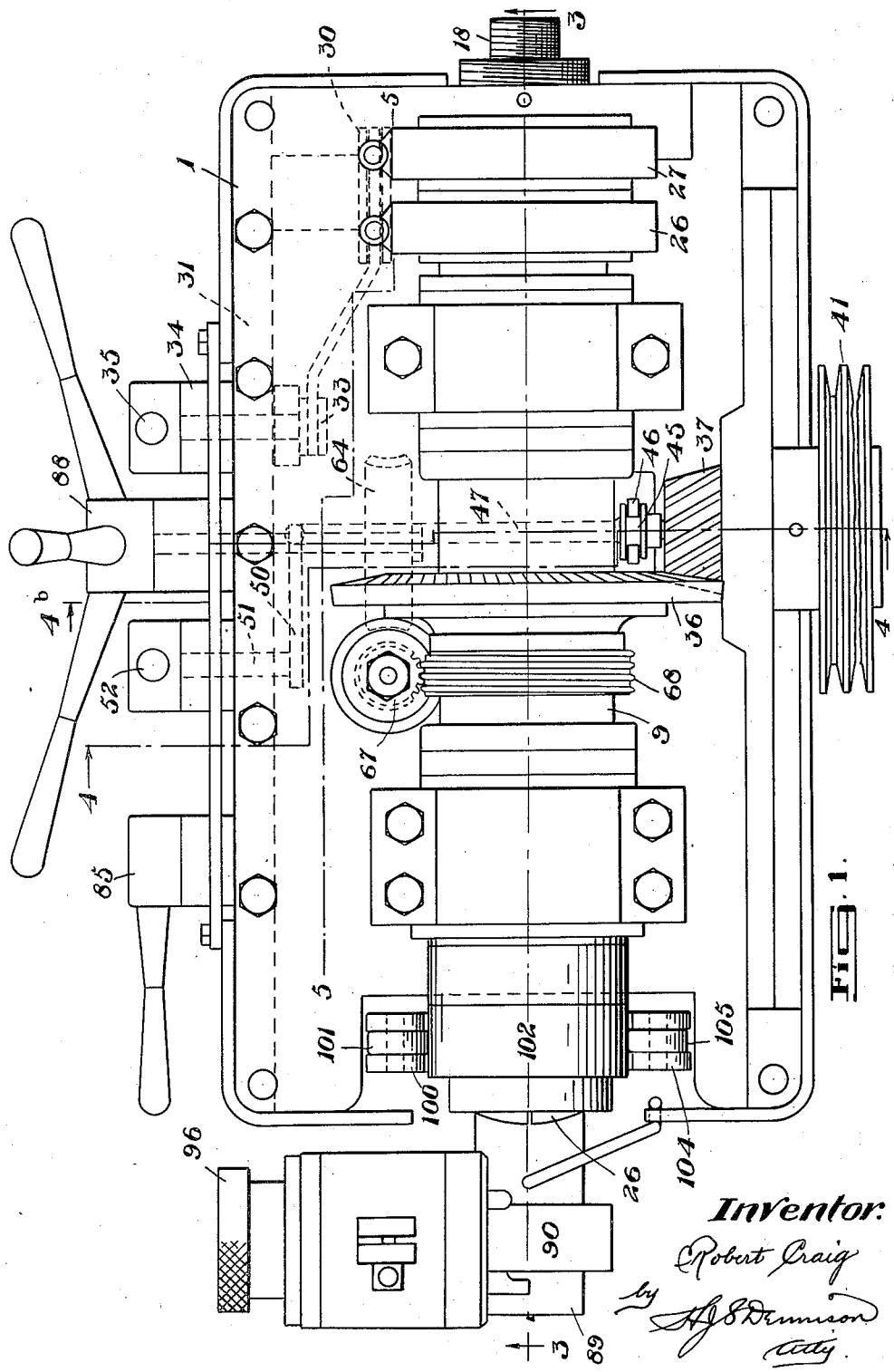
Figure 1 is a plan view of my improved lathe mechanism.

Referring to the accompanying drawings 1 is a base plate provided with downwardly extending lug projections 2 and 3 arranged intermediate of its width and having a transverse slot 4 arranged between said lugs.

Bearing lugs 5 and 6 extend upwardly from the plate 1 above the lugs 2 and 3 respectively, and in these lugs are mounted bearing sleeves 7 and 8.

A cylindrical sleeve 9 is rotatably journalled in the bearing sleeves 7 and 8 and is secured from longitudinal movement therein by lock nuts 10 and 11 threaded thereon and engaging the inward ends of the sleeves 7 and 8 respectively. One end of the sleeve 9 is formed with a cylindrical reduced end portion 12 having an externally threaded terminal end on which is threaded the differential gear hub 13 which is provided with radial studs on which are mounted the bevel gear pinions 14.

A cylindrical drum 15 is provided with a reduced hub portion journalled in the bearing 7, and mounted within the drum is a bevelled gear ring 16 which meshes with the pinions 14.

A tubular collet 17 is slidably mounted within the sleeve 9 and is provided with an externally threaded end 18 which extends beyond the reduced end 12 of the sleeve 9, and threaded on this threaded extension of the collet is a bevel gear 19 which meshes with the pinions 14 on the side opposite to that engaging the bevel gear 16.

Secured to the bevel gear 19 is a drum 20 similar to the drum 15, said drums forming a housing for the differential gear formed by the gears 16 and 19 and the pinions 14.

A thrust bearing 21 is arranged between the differential gear hub 13 and the gear 19.

Lock nuts 22 for limiting the endwise movement of the collett 17 are threaded on the outward end of the collet, and these are enclosed within a ferrule 23 secured in a bracket 24 mounted on the base plate 1.

The end of the sleeve 9 opposite to that carrying the differential gear is formed with a taper opening 25, and the collet 17 is formed with a taper head 26 to wedge in said opening, the collet being longitudinally slotted.

The opening in the slotted end of the collet is shaped to correspond with the perimeter of the rod to be turned, and when the collet is drawn inwardly into the sleeve 9 the rod is gripped securely thereby with one end projecting therefrom the desired distance so that it may be operated on by the cutting tool.

The drums 15 and 20 are provided with brake bands 26 and 27 respectively and the free ends of these bands are connected to rods 28 and 29 respectively which extend vertically downward through openings in the base plate, and the lower T-shaped ends of these rods are engaged by a rocker member 30 which is pivotally mounted in a bearing carried by a side plate 31 extending downwardly from one side of the base plate.

The lower end of the rocker member extending below its pivot is connected by a link 32 to a lever member 33 journalled in the boss 34 on the side plate 31, said lever having a hand-operated lever 35 on its outer end, by means of which the brakes of the differential gear described are operated.

Mounted on the sleeve 9 is a bevel gear 36 which meshes with a pinion 37 journalled in a bracket 38 extending upwardly from the side of the bed plate 1 opposite to the side to which the downwardly extending side plate 31 is secured. The detail of the mounting of the pinion 37 is particularly illustrated in Figure 4. The shaft of the pinion 37 is mounted in a ball bearing 39 supported in a rigid sleeve 40 carried in the bracket 38.

A drive pulley 41 is rotatably mounted externally of the rigid sleeve 40 and is provided with a clutch band 42 which is engaged by a suitable clutching device carried on the inner end of the pinion shaft and here shown as including a pair of radially slidable bolt members 43, the inner ends of which are engaged by a taper pin 44 extending longitudinally of the axis of the pinion shaft.

The mechanism of this clutch is not described in complete detail as numerous forms of mechanisms for effecting disconnecting clutch operation between the drive pulley and the pinion may be used. In the form shown the inner end of the pin 44 is provided with a grooved collar 45 which is engaged by the fork end 46 of a rocker arm 47 which extends through the slot 4 in the bed plate and is pivotally mounted on a pin 48 below the bracket 38.

The lower end of the rocker arm 47 extends transversely of the machine and is provided with a forked end 49 which is engaged by a lever 50 mounted on a spindle 51 journalled in a boss in the side plate 31, said spindle being secured to an operating handle 52 by means of which the operator may control the starting and stopping of the rotation of the sleeve 9 and the collet carried thereby.

The operation of the handle 52 turns the spindle 51 and crank 50 to swing the rocker arm 47 on its pivot in an upward direction, thereby moving the taper pin 44 longitudinally to force the clutch members 43 outwardly and operate the clutch to connect the gear pinion 37 with the driving pulley 41, and by movement in the opposite direction of the lever 52 the clutch may be disengaged, allowing the drive pulley to rotate freely.

A bar 53 is slidably mounted in the lugs 2 and 3 extending downwardly from the bed plate and its axis is parallel with the axis of the sleeve 9. This bar is cylindrical in form and is adapted to be rotated as well as being capable of longitudinal sliding movement.

Attached to the shouldered end 54 of the bar 53 is an arm 55 which extends laterally, and the extending end thereof has secured thereto a rod 56 provided with a cross head 57 to which are attached a pair of coil tension springs 58, the opposite ends of which are secured on a bracket 59 extending from one side of the lug 3 on the underside of the bed plate, said springs thus maintaining spring pressure to hold the bar 53 to a limit position, as illustrated in Figures 3 and 12.

Intermediate of the length of the bar 53 and between the brackets 2 and 3 said bar is provided with circumferentially cut teeth 60. A shaft 61 is journalled in bearing extensions 62 in the lower portion of the lug 2, and a spur pinion 63 is keyed to this shaft centrally below the bar 53, the teeth thereof meshing with the teeth 60 of said bar.

Rotatably mounted on the shaft 61 and journalled in one of the bearings 62 is a worm wheel 64 which meshes with a worm 65 mounted on the lower end of a shaft journalled in a vertically arranged sleeve 66 which is rigidly secured in the bed plate at one side of the bar 53.

Figure 2:
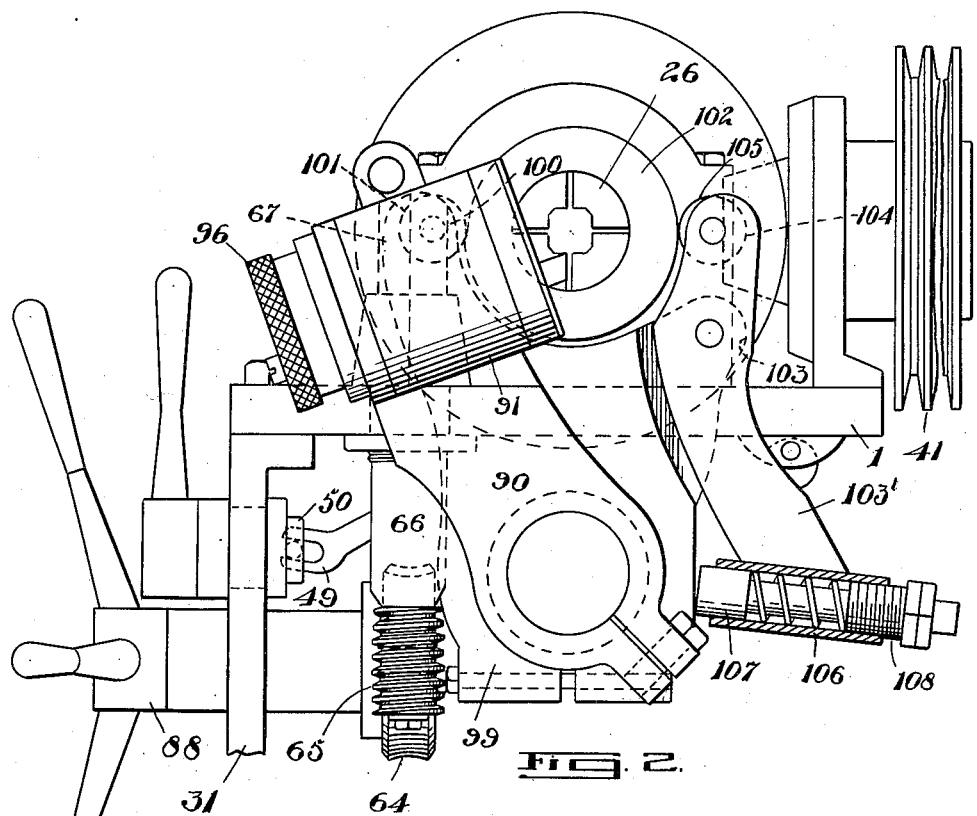
Figure 2 is an end elevational and part sectional view of the machine looking toward the tool holder end.
Figures 8, 9, 10:
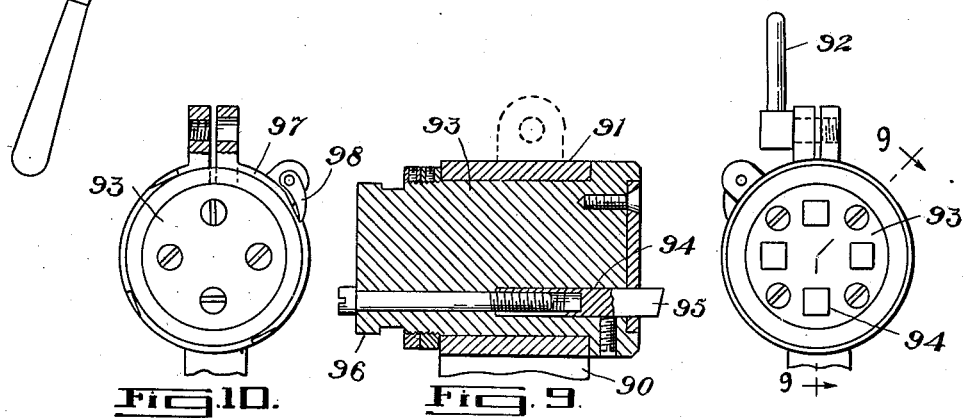
Figure 8 is an elevational view of the inward end of the tool holder.
Figure 9 is a longitudinal sectional view of the tool holder taken on the line 9—9 of Figure 8.
Figure 10 is an elevational view of the outward end of the tool holder.
Figure 11:
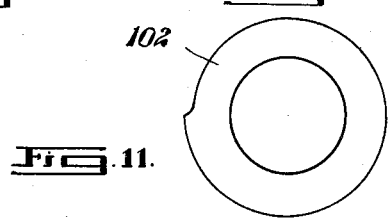
Figure 11 is an end elevational view of the cam for operating the tool holder.

On the upper end of the shaft mounted in the sleeve 66 is secured a worm wheel 67, as indicated in Figures 1 and 2, and this worm wheel meshes with a worm 68 which is mounted on the sleeve 9 adjacent to the bevel gear 36 and rotates therewith.

The rotation of the worm 68 drives the worm 67, and through the connecting shaft operates the worm 65 which in turn rotates the worm wheel 64. The worm wheel 64 is rotatably mounted on the shaft 61 and operates said shaft to rotate the pinion 63 and slide the bar 53 longitudinally when desired by the operation of a suitable clutch device.

The clutch device herein shown comprises a spring ring 69, shown particularly in Figures 4 and 6a, which is spread by the operation of a tiltable block 70 mounted between its ends, the spring and block being housed in a recess 71 in the worm gear.

An eccentric pin 72 mounted in a sleeve disc 73 which is keyed on the shaft 61, has secured on its outer end a curve lever 74 which is provided with a laterally extending lug 75 carrying an adjustable contact screw 76.

A sleeve 77 is rotatably mounted on the sleeve of the disc 73 and has a projecting cam 78, which, upon rotation of the sleeve 77, will move into contact with the contact screw 76, swinging the lever 74, thereby rotating the eccentric pin 72 to operate the block 70 and spread the clutch ring 69 to frictionally engage the inner surface of the recess 71 of the worm wheel, thereby effecting the connection of the worm wheel to the shaft, so that the gear train from the worm 68 on the sleeve 9 to the worm wheel 67 through its shaft to the worm 65 and worm wheel 64 to the shaft 61 and the pinion 63 is completed, and the pinion in rotating slowly through the worm gear driving mechanism described, feeds the bar 53 longitudinally.

In order to operate the clutch connecting the shaft 61 with the worm wheel 64 the sleeve 77 is provided with a spur gear 79. This spur gear meshes with a rack 80 which is slidably mounted between brackets 81 on the inner face of the side plate 31.

The rack 80 is provided with a downwardly extending lug 82 to which is connected a link 83 connected to a crank 84, which in turn is connected to a hand lever 85 journalled in a boss on the plate 31.

A tension spring 86 connected to the lever 84 and adapted to return the rack to its normal position is connected to a pin 87 mounted on the plate 31.

In order that the shaft 61 may be operated by hand quickly a capstan lever 88 is secured to the outer end of the shaft.

The longitudinal movement of the bar 53 is required to operate the cutting tool for cutting the bar carried by the collet 17. A suitable form of tool holder is herein shown attached to the projecting end 89 of the bar 53. This tool holder is in the form of a clamp arm 90 which has at its upper end a cylindrical-shaped holder 91 which is preferably slotted longitudinally and provided with paired projecting lugs and a clamp screw 92.

Mounted in the cylindrical holder is a cylindrical head 93 which is provided with a plurality of tool-holding recesses 94 in which cutting tools 95 are adjustably mounted in a suitable manner. Several different cutting tools may be mounted in the head so that when a tool becomes dull it is merely necessary to loosen the clamp screw 92, rotate the head within the holder by gripping the knurled end 96, and when turned to the proper position the clamp may again be tightened.

In order to ensure the tool head being turned to the proper position for the effective cutting of the tool a notched ring 97 is provided on the head which is engaged by a positioning dog 98 mounted on the holder 91.

A clamp member 99 encircles the end of the bar 53 projecting from the lug 3 and is securely clamped thereon. This clamp member has an arc-shaped upper end extending to one side of the sleeve 9 which is provided with a jaw end 100 in which is mounted a roller 101. The roller engages a master cam sleeve 102 which is rigidly secured on the end of the sleeve 9, and the perimeter of which is shaped on an enlarged scale to the contour of the perimeter of the rod which is to be cut and which is secured in the collet.

A lug 103 extends from the clamp member 99 on the side opposite to the jaw 100, and to this lug is pivoted an arm 103′, said arm having a jaw extension 104 in which a roller 105 is mounted, which roller also engages the peripheral surface of the master cam 102.

The arm 103′ has formed on its lower end a tubular extension 106 in which is slidably mounted a plunger 107 which projects inwardly from the tubular extension and engages the edge of the clamp member 99.

An adjustable screw plug 108 supports the plunger and a coil spring 109 is arranged between the plunger and its support. This spring-actuated plunger holds the roller 105 in close engaging contact with the master cam surface and the spring pressure thus applied ensures that both rollers 101 and 105 are held in close engaging contact with the cam.

As the sleeve 9 rotates the cam is rotated and also the collet carrying the piece of drill rod, the end of which is to be turned. The tool carried by the tool head is adjusted to engage and cut the periphery of the drill rod held in the collet, and as the cam rotates, its cam surface engaging the rollers carried by the clamp member 99 mounted on the bar 53, swings the bar, and as the bar swings in relation to the axis of the sleeve 9 the tool arm 90, which is clamped to the bar 53, is swung so as to move the tool relative to the surface of the work, and as the master cam swings the members in relation to the asymmetric contour, the tool will produce a reproduction of that same contour on a reduced scale on the perimeter of the drill rod mounted in the collet.

In a machine such as described the base plate 1 is mounted on a suitable support and a motor is suitably connected with the drive wheel 41. The operator by manipulating the handle 52 on the front of the machine operates the clutch mechanism carried by the drive wheel 41 to drive the pinion 37 which transmits motion to the gear 36, thereby rotating the sleeve 9 on which the gear is mounted.

Before the sleeve 9 is set into motion the operator places a rod to be turned into the collet with the end thereof projecting a suitable distance therefrom to be operated upon by the cutting tool carried in the tool holder 93.

By manipulating the handle 35 on the front of the machine and, through it and its connections operating the rocker member 39, the brake band 26 is tightened to hold the drum 15 from rotating. Consequently as the sleeve 9 rotates it carries with it the differential gear hub 13 and its pinions, and these rotate the gear 19 which is threaded on the threaded end of the collet 17.

The relative rotative movement of the gear on the threaded collet draws the collet longitudinally so that its slotted end 26 tightens and grips the bar to be turned.

The operator by the use of the capstan lever 88 turns the shaft 61 and pinion 63 engaging the toothed periphery of the bar 53, slides the bar longitudinally in opposition to the pull of the springs 58 to move the tool holder into position with a cutting tool to engage the rotating bar mounted in the collet carried by the rotating sleeve 9.

The automatic longitudinal feed of the bar 53 may then be put into operation by operating the handle 65 the lever and link connection thereon moves the rack 80 longitudinally, thereby rotating the gear 79 to operate the clutch band 69 and its co-operating parts to complete a driving connection between the worm wheel 64 and the shaft 61 operating the pinion 63 and the bar 53. The worm wheel 64 is driven through the worm connections described from the rotating worm 68 mounted on the sleeve 9.

As the sleeve 9 rotates, the master cam 102 carried thereby contacting with the roller 101 carried by the arm 90 clamped upon the bar 53, is caused to move with a swinging movement corresponding to the contour of the cam which is herein illustrated as an Archimedes spiral.

The rotative movement imparted to the bar 53 is transmitted to the clamp arm 90 carrying the tool holder, and the tool is thus moved inwardly and outwardly toward and from the axis of the work piece carried in the collet to cause the cutting of the work with a contour corresponding to the contour of the master cam. This rocking movement of the tool holder operates every revolution of the work, and the tool is fed longitudinally to cut the surface of the work for the desired length.

Upon the completion of the cut the lever 35, which will have been returned to its central position following the gripping of the rod in the collet, is operated in the reverse direction so that the brake band 27 grips and holds the drum 20 and the gear 19. The rotation of the collet in its threaded engagement with the gear 19 not held stationary causes the collet to be moved longitudinally so that the taper head end 26 is released from its gripping pressure as the bar is released, whereupon the lever 35 is again returned to its normal position.

Before manipulating the lever 35 to effect the release of the work the operator, by means of the handle 85, will disconnect the automatic feed by shifting the rack and its co-operating parts to release the clutch connecting the worm-operated feed mechanism with the shaft 61 and feed pinion 63.

It will be understood that the roller 101 carried by the clamp arm 99 will be held in close engaging contact with the peripheral surface of the master cam by reason of the pivotal arm 103' mounted on the arm 199 with its contact roller 105 held snugly in engagement with the cam surface opposite to the roller 101 by means of the spring plunger 107.

A machine such as described has been found to be extremely efficient in the shaping of the ends of lengths of drill rod with special shapes adapted to engage in interlocking contact with specially designed drill bits, particularly that type of drill bit used in rock drilling.

The machine is very compact and easy to operate.

What I claim as my invention is:

1. A lathe comprising a base, a sleeve rotatably mounted on said base adapted to carry the work to be turned, a bar slidably and rockably mounted parallel with said sleeve, means operatively connected with said rotatable sleeve for reciprocating said bar, a tool carrier mounted on said bar to engage the work carried by said sleeve, means operatively connected to said sleeve for moving said tool-carrying bar longitudinally, and means operative through the rotation of said sleeve for rocking said bar and the tool carried thereby.

2. A lathe comprising a base, a work-carrying sleeve rotatably mounted on said base, means for rotating said sleeve, a rotatable bar slidably mounted on said base arranged parallel with said sleeve, a tool carrier mounted on said bar carrying a tool adapted to engage the work carried by said sleeve, a shaft mounted on said base having its axis arranged transverse to the axes of said sleeve and slidable bar, reduction gears connecting said rotatable sleeve and transverse shaft, a gear operatively connected with said bar to move it longitudinally, gearing connecting the latter gear with said transverse shaft, and means operatively connected with said sleeve for rocking said bar during the longitudinal movement of said bar.

3. A lathe comprising a base, a work-carrying sleeve rotatably mounted on said base, a bar rotatably and slidably mounted on said base parallel with said sleeve, a shaft mounted perpendicular to the base in transverse relation to said sleeve and slidable bar and offset therefrom, a worm mounted on said sleeve, a worm wheel mounted on said shaft meshing with said worm, a worm carried by said perpendicular shaft, a shaft arranged perpendicular to the aforesaid shaft and transverse to said slidable bar, a toothed gear mounted on the latter shaft, said bar having circumferential teeth meshing with said toothed gear, a tool carrier mounted on said bar carrying a tool adapted to engage the work carried by said sleeve, and means for rocking said bar during its longitudinal movement.

4. A device as claimed in claim 3, in which the worm wheel mounted on the transverse shaft is rotatable on said shaft, a clutch connected with said transverse shaft adapted to engage said worm wheel to rotate said shaft, manually operated means for engaging and disengaging said clutch, and manually operated means for rotating said transverse shaft.

5. A device as claimed in claim 3, in which the worm wheel is rotatably mounted on said transverse shaft, a clutch mounted on said transverse shaft adapted to engage said worm wheel to rotate said shaft, a gear wheel rotatably mounted on said transverse shaft, clutch-operating means carried by said gear wheel adapted to control the operation of said clutch, a gear rack slidably mounted on said base and meshing with said clutch-operating gear wheel, and manually operable means for reciprocating said rack.

6. A device as claimed in claim 3, in which said worm wheel is rotatably mounted on said transverse shaft, a clutch connected with said shaft and operatively connected with said latter shaft, a gear wheel rotatably mounted on said transverse shaft having means for engaging and disengaging said clutch with said worm wheel, a rack slidably mounted on said base, manually operated lever and link means for moving said rack longitudinally in one direction to operate the gear wheel on said transverse shaft to effect the engagement of the clutch with said worm wheel, and spring means for operating said rack in the opposite direction.

7. A lathe comprising a base, a sleeve rotatably mounted on said base, means for rotating said sleeve, a master cam mounted on said sleeve, a bar rotatably and slidably mounted on said base parallel with said sleeve, an arm rigidly secured to said bar having a jaw end spanning and engaging said master cam, said jaw having one side thereof pivotally mounted on the other, a spring-actuated plunger mounted on said pivotal jaw member and engaging the jaw member rigidly mounted on said bar, a tool carrier rigidly mounted on said bar carrying a tool adapted to engage the work carried by said sleeve, and means for moving said bar longitudinally while said sleeve is rotating.

ROBERT CRAIG.

REFERENCES CITED

The following references are of record in the file of this patent:

UNITED STATES PATENTS

| Number | Name | Date |
|---|---|---|
| 1,506,400 | Wynne | Aug. 26, 1924 |
| 1,393,205 | Daniels | Oct. 11, 1921 |
| 2,080,830 | Mobius | May 18, 1937 |
| 910,466 | Fay | Jan. 19, 1909 |
| 400,882 | Tower | Apr. 2, 1889 |
| 919,986 | Whitney | Apr. 27, 1909 |
| 1,118,072 | Thompson | Nov. 24, 1914 |